(12) United States Patent
Grover et al.

(10) Patent No.: US 10,593,201 B2
(45) Date of Patent: Mar. 17, 2020

(54) COMPUTER SYSTEM WITH TRAFFIC CONTROL MECHANISM AND METHOD OF OPERATION THEREOF

(71) Applicant: Telenav, Inc., Santa Clara, CA (US)

(72) Inventors: Shalu Grover, Sunnyvale, CA (US); Gregory Stewart Aist, Santa Clara, CA (US); Casey Carter, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 91 days.

(21) Appl. No.: 15/716,037

(22) Filed: Sep. 26, 2017

(65) Prior Publication Data

US 2019/0096245 A1    Mar. 28, 2019

(51) Int. Cl.
    *G08G 1/095* (2006.01)
(52) U.S. Cl.
    CPC .................................. *G08G 1/095* (2013.01)
(58) Field of Classification Search
    None
    See application file for complete search history.

(56) References Cited

U.S. PATENT DOCUMENTS

| | | | |
|---|---|---|---|
| 8,364,392 B2 | 1/2013 | Chao | |
| 10,024,685 B2* | 7/2018 | Verheijen | B60R 16/0236 |
| 2011/0161004 A1 | 6/2011 | Chao | |
| 2013/0325284 A1* | 12/2013 | Sato | G08G 1/0112 701/96 |
| 2014/0100767 A1* | 4/2014 | Miljkovic | G01C 21/3697 701/123 |
| 2016/0019783 A1* | 1/2016 | Gao | G08G 1/052 340/916 |
| 2018/0075739 A1* | 3/2018 | Ginsberg | B60K 35/00 |

* cited by examiner

*Primary Examiner* — Tamara L Weber
(74) *Attorney, Agent, or Firm* — Perspectives Law Group, Corp.

(57) ABSTRACT

A method of operation of a computer system includes: generating a pace maker including an illumination configuration with a control unit for actuating a pace maker device based on an actuation pattern; presenting the pace maker based on a pace maker type for controlling a travel pace; and determining a pace match level based on comparing the travel pace and the pace maker.

20 Claims, 6 Drawing Sheets

COMPUTER SYSTEM WITH TRAFFIC CONTROL MECHANISM AND METHOD OF OPERATION THEREOF

TECHNICAL FIELD

The present invention relates generally to a computer system, and more particularly to a system with traffic control mechanism.

BACKGROUND ART

Modern portable consumer and industrial electronics, especially client devices such as computer systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Computer systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a computer system improving traffic control mechanism to control an operation of vehicle has become a paramount concern for the consumer. The inability decreases the benefit of using the tool.

Thus, a need still remains for a computer system with traffic control mechanism to a device during operation of vehicle. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a computer system including: generating a pace maker including an illumination configuration with a control unit for actuating a pace maker device based on an actuation pattern; presenting the pace maker based on a pace maker type for controlling a travel pace; and determining a pace match level based on comparing the travel pace and the pace maker.

The present invention provides a computer system, including: a control unit for: generating a pace maker including an illumination configuration; actuating a pace maker device based on an actuation pattern; presenting the pace maker based on a pace maker type for controlling a travel pace; determining a pace match level based on comparing the travel pace and the pace maker; and a communication unit, coupled to the control unit, for transmitting the pace match level.

The present invention provides a computer system having a non-transitory computer readable medium including instructions for execution, the instructions comprising: generating a pace maker including an illumination configuration for actuating a pace maker device based on an actuation pattern; presenting the pace maker based on a pace maker type for controlling a travel pace; and determining a pace match level based on comparing the travel pace and the pace maker.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
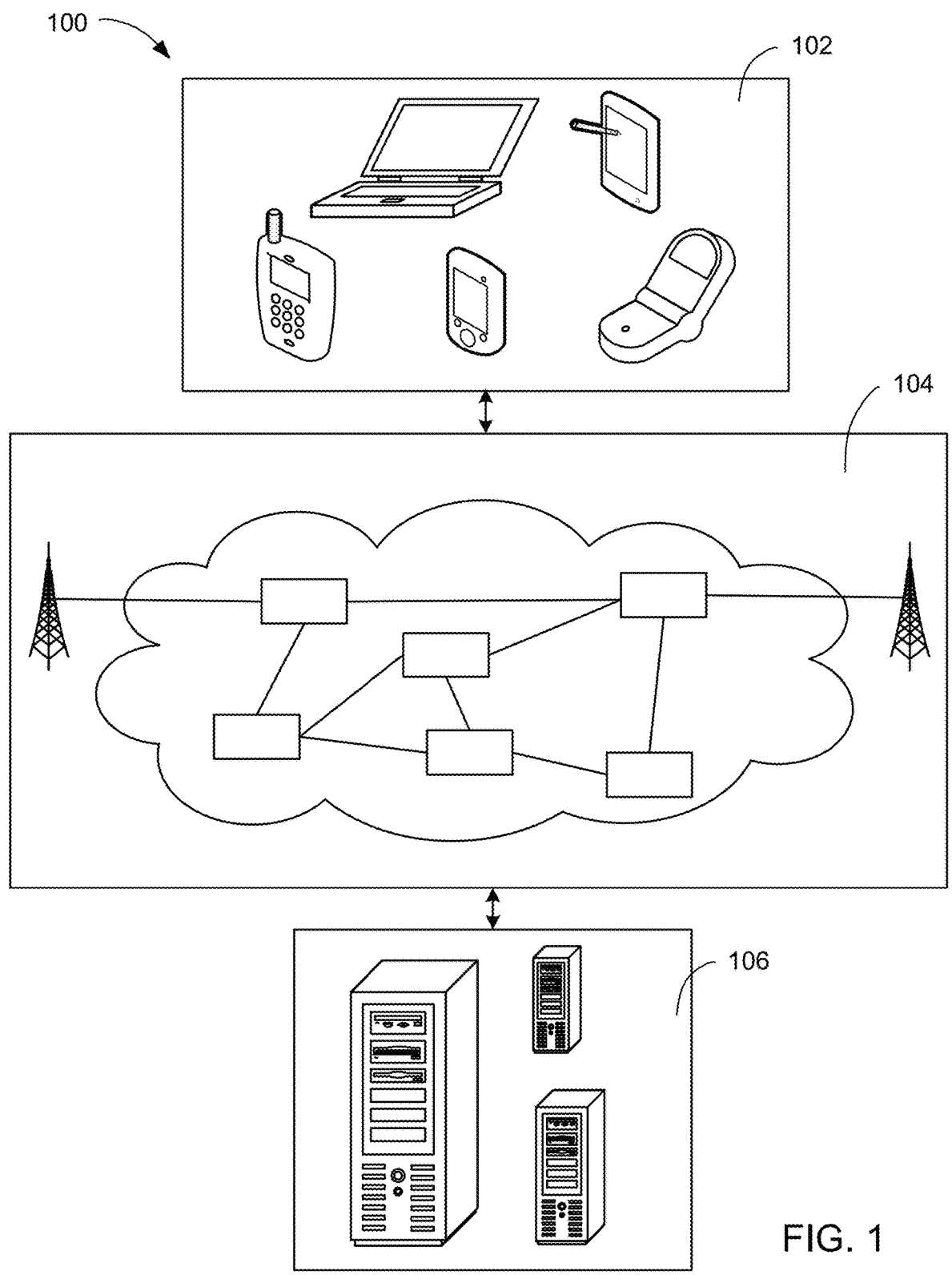
FIG. 1 is a computer system with traffic control mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the computer system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a computer system 100 with traffic control mechanism in an embodiment of the present invention. The computer system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic computer system, a head unit, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the computer system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the computer system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the computer system 100 is shown with the second device 106 and the first device 102 as end points of the communication path 104, although it is understood that the computer system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
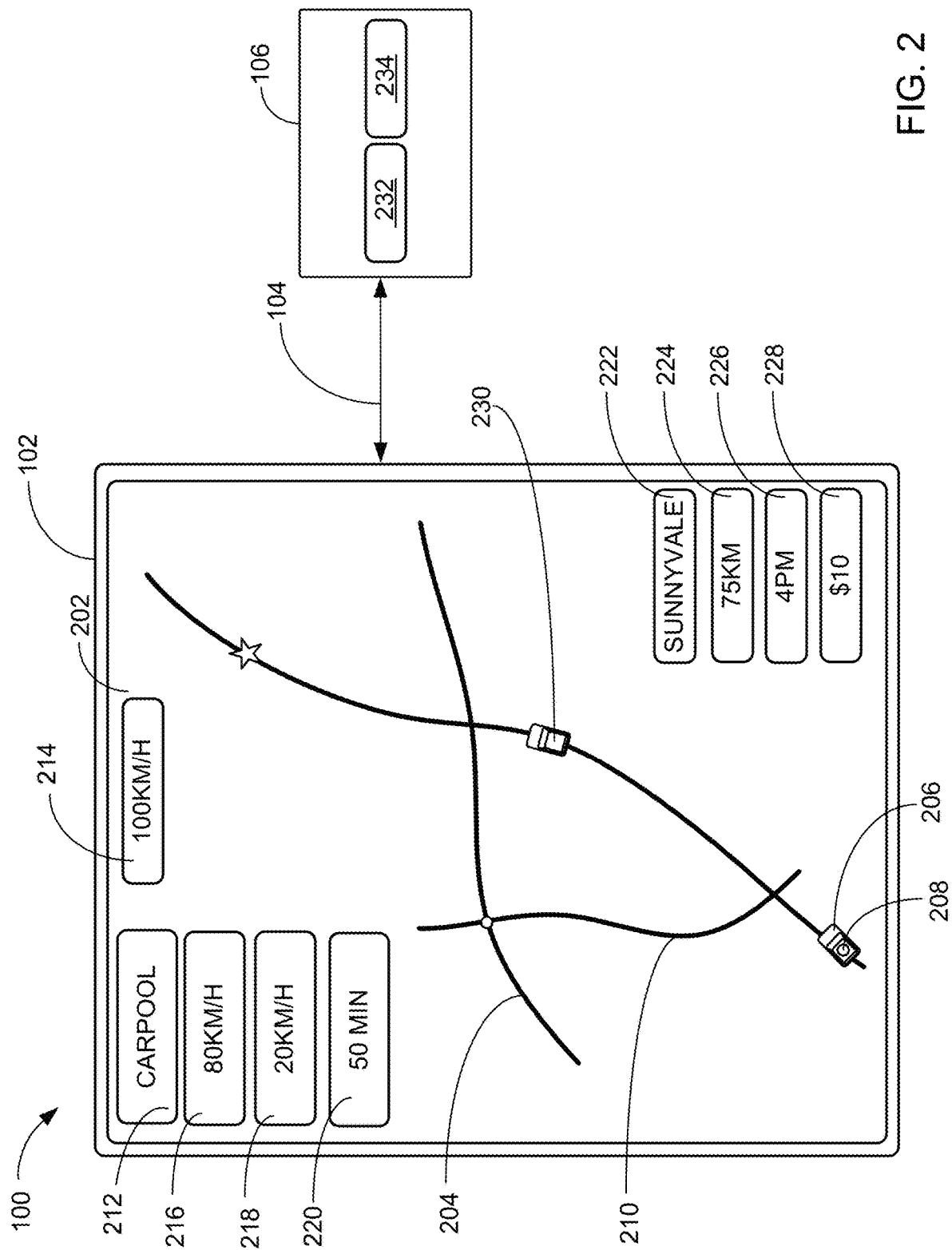
FIG. 2 is an example of information considered by the computer system.

Referring now to FIG. 2, there is shown an example of information considered by the computer system 100. For clarity and brevity, the discussion of the embodiment of the present invention will focus on the first device 102 delivering the result generated by the computer system 100. However, the second device 106 and the first device 102 can be discussed interchangeably. The first device 102 and the second device 106 can communicate via the communication path 104.

A travel context 202 is defined as a situation or circumstance surrounding the first device 102 while traveling. For example, the travel context 202 can include a traffic condition on a road segment 204 such as no traffic, moderate traffic, heavy traffic, traffic jam, standstill, or a combination thereof traveled by a user's vehicle 206. For a different example, the travel context 202 can include a time of day, week, month, year, season, or a combination thereof. For another example, the travel context 202 can include a weather condition while traveling on the road segment 204.

The road segment 204 is defined as a path one can travel from one physical location to another physical location. The road segment 204 can include a street type 210 including a dirt path, local road, arterial road, expressway, freeway, highway, tolled road, or a combination thereof. The street type 210 is a classification of the road segment 204. For example, the user's vehicle 206 can travel on the road segment 204 representing the highway for commuting to work.

The road segment 204 can include a lane type 212. The lane type 212 a classification of a lane of the road segment 204. For example, the lane type 212 can include a carpool or high occupancy vehicle (HOV) lane. For another example, the lane type 212 can include a non-carpool lane.

The user's vehicle 206 is defined as a machine that a user of the first device 102 travels on. For example, the first device 102 can be installed on the user's vehicle 206 or the user can carry the first device 102 while traveling on the user's vehicle 206. The user's vehicle 206 can include manual driving vehicle or self-driving vehicle. The user's vehicle 206 can include gasoline powered vehicle, electric powered vehicle, hydrogen powered vehicle, or a combination thereof. The user's vehicle 206 can include a transport vehicle for air, land, sea, or a combination thereof.

A current location 208 is defined as a physical location of the first device 102. For example, the current location 208 can represent the physical location of the user with the first device 102, the user's vehicle 206 with the first device 102, or a combination thereof.

A travel speed 214 is defined as a rate of motion for the user's vehicle 206. For example, the user's vehicle 206 can travel at the travel speed 214 set by the government. A speed threshold 216 is defined as a limit for the travel speed 214. For example, the speed threshold 216 can include the predefined speed set by the government for the road segment 204, the street type 210, the lane type 212, or a combination thereof. For another example, the speed threshold 216 can represent the minimum or maximum speed.

A speed difference 218 is defined as a level of variation between the travel speed 214 and the speed threshold 216. For example, the speed difference 218 can measured in percentages, rate of motion, or a combination thereof.

A travel duration 220 is amount of time for travel. For example, the travel duration 220 can represent the amount of time traveled in a geographic region 222. The geographic region 222 is defined as a physical area. A travel distance 224 is defined as a physical distance of user's travel. For example, the travel distance 224 can represent the physical distance required to travel from the start location to the target destination. The travel duration 220 can include the amount of time to travel the travel distance 224.

An estimated time of arrival 226 is defined as a prediction of when the user's vehicle is expected to arrive at a location. For example, the estimated time of arrival 226 for traveling at the travel speed 214 for the travel duration 220 can be 12 pm. A travel cost 228 is defined as monetary fee required for the travel. For example, the travel cost 228 can include a monetary fee incurred from a toll plaza, bridge, or carpool lane.

Other's location 230 is defined as a physical location of other entity. For example, the other's location 230 can include the physical location of vehicle other than the user's vehicle 206 on the road segment 204. For another example, the other's location 230 can include the physical location of other user with the first device 102. The other's vehicle can include the first device 102, the computing system 100, or a combination thereof.

A separation distance 232 is defined as a physical distance been the current location 208 and the other's location 230. For example, the separation distance 232 can include the physical distance between the user's vehicle 206 and the other's vehicle. A distance threshold 234 is defined as a limit on the separation distance 232. For example, the distance threshold 234 is defined as minimum or maximum physical distance.

Figure 3:
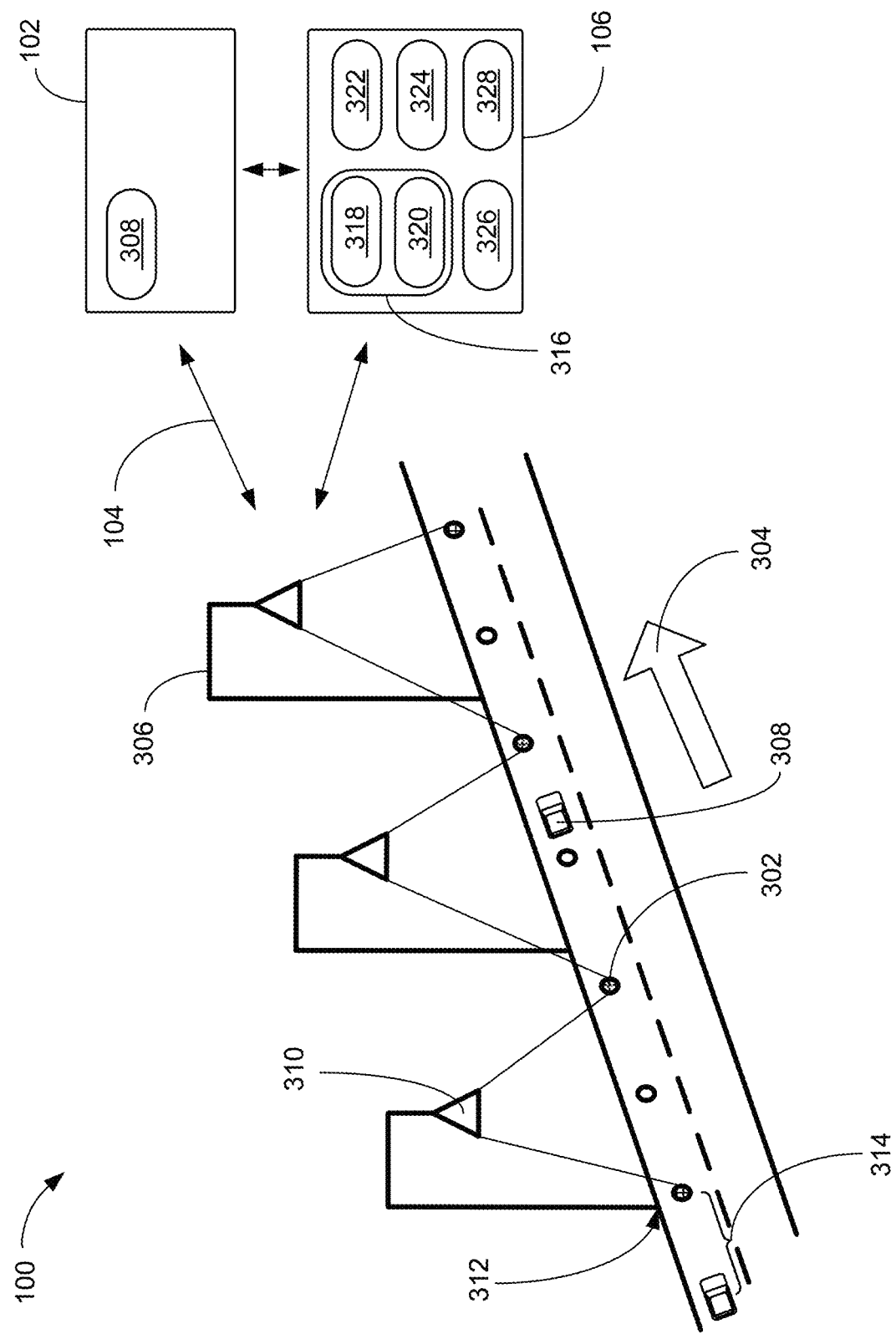
FIG. 3 is an example of presenting a pace maker.

Referring now to FIG. 3, therein is shown an example of presenting a pace maker 302. The pace maker 302 is defined as a notification to control a travel pace 304. The travel pace 304 is defined as a tempo of speed for traveling. For example, the computing system 100 can present the pace maker 302 for the user's vehicle 206 of FIG. 2 to maintain a consistent rate of the travel speed 214 of FIG. 2.

The pace maker 302 can include a pace maker type 306, which is defined as a classification of the pace maker 302. For example, the pace maker type 306 can include a virtual pace maker 308, a pace maker device 310, or a combination thereof. The virtual pace maker 308 is defined as a digital graphic to control the travel pace 304. For example, the virtual pace maker 308 can represent a simulated digital icon of a vehicle. For further example, the virtual pace maker 308 can be displayed on the first device 102, projected on the windshield of the user's vehicle 206, or a combination thereof. The first device 102, the second device 106, or a combination thereof can interact with the pace maker device 310 via the communication path 104.

The pace maker device 310 is defined as a mechanism to provide the pace maker 302. For example, the pace maker device 310 can include a street light, a road reflector, a license plate, a license plate frame, or a combination thereof. The pace maker device 310 can emit light emitting diode (LED) light, the virtual pace maker 308, or a combination thereof.

A pace maker location 312 is defined as a physical location of the pace maker device 310. For example, the pace maker location 312 of the pace maker device 310 can be at the road segment 204 representing a highway. A pace maker distance 314 is defined as a physical distance between the current location 208 of FIG. 2 and the pace maker location 312. For example, the pace maker distance 314 can change as the user's vehicle 206 approaches the pace maker location 312 of the pace maker device 310.

The computing system 100 can present the pace maker 302 including an illumination configuration 316. The illumination configuration 316 is defined as a combination of attributes presenting the pace maker 302. For example, the illumination configuration 316 can include a pace maker intensity 318, a pace maker coloration 320, or a combination thereof. The pace maker intensity 318 is defined as a level of luminosity of the pace maker 302. For example, the computing system 100 can adjust the pace maker intensity 318 to increase or decrease the brightness of the pace maker 302. The pace maker coloration 320 is defined as a combination of color of the pace maker 302. For example, the pace maker coloration 320 can be represented in Red Green Blue (RGB) color model.

The computing system 100 can present the pace maker 302 based on an actuation pattern 322. The actuation pattern 322 is defined as a presentation arrangement of the pace maker 302. For example, the computing system 100 can control how often the pace maker 302 can be presented within a time period 324. The time period 324 is defined as a predefined length of timeframe. For example, the time period 324 can be set in seconds, minutes, hours, days, months, years, seasons, or a combination thereof. For another example, the actuation pattern 322 can indicate which instance of the pace maker device 310 to be actuated to present the pace maker 302.

A pace match level 326 is defined as a degree of matching the travel pace 304 presented by the pace maker 302. For example, the travel speed 214 of the user can be below, equivalent, or above the travel pace 304 presented by the pace maker 302. For example, the computing system 100 can track how often the travel speed 214 of the user matched or deviated from the travel speed 214 presented by the pace maker 302 to determine the pace match level 326. For a different example, the computing system 100 can track the level of deviation between the travel speed 214 of the user and the travel speed 214 presented by the pace maker 302 to determine the pace match level 326.

A match ranking 328 is defined as an order of the pace match level 326. For example, the match ranking 328 can include an order from the highest instance of the pace match level 326 to the lower instance of the pace match level 326. For further example, the match ranking 328 can rank in order of multiple users of the computing system 100 utilizing the pace maker 302 to control the travel pace 304 of the travel.

Figure 4:
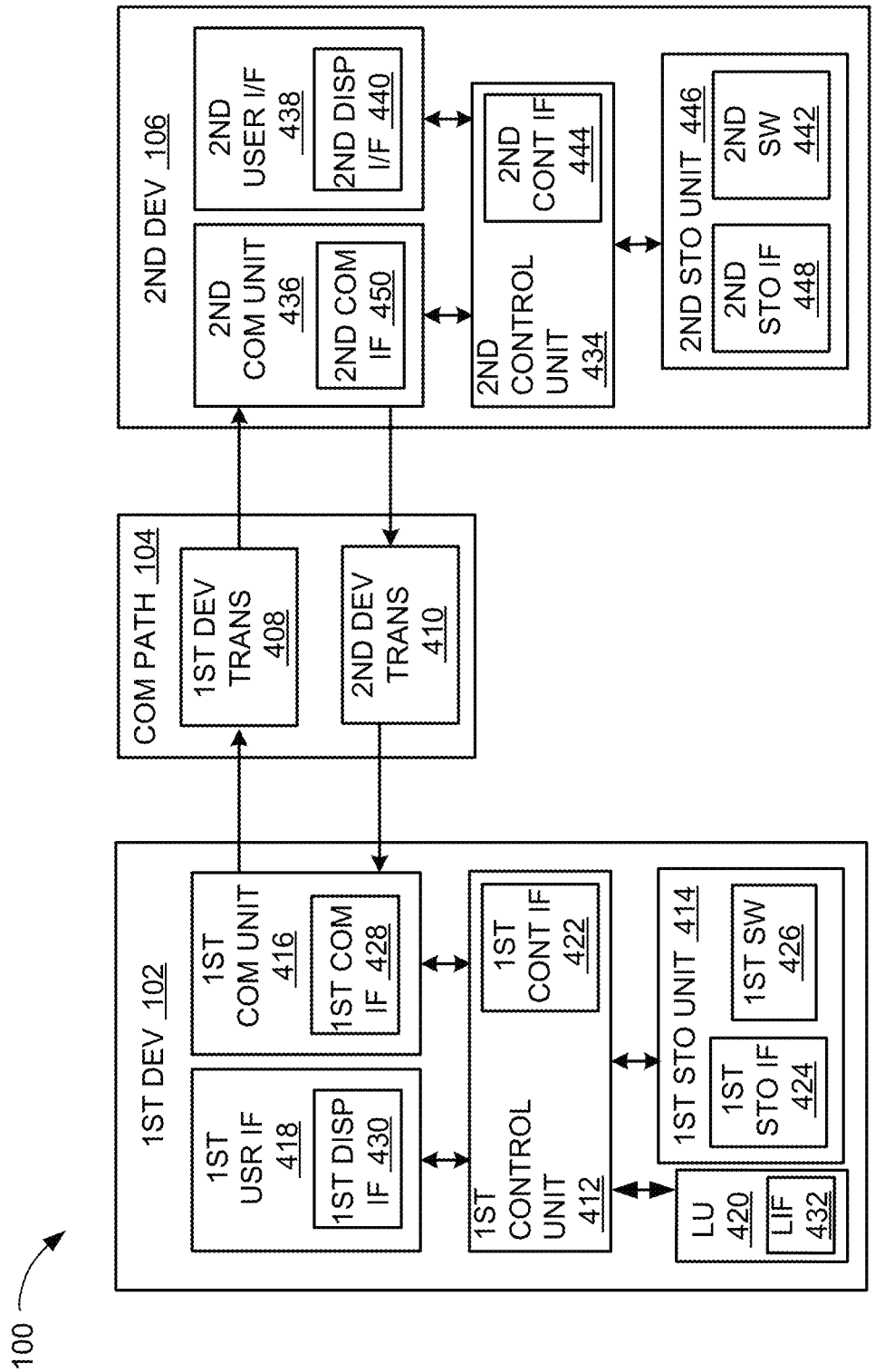
FIG. 4 is an exemplary block diagram of the computer system.

Referring now to FIG. 4, therein is shown an exemplary block diagram of the computer system 100. The computer system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the computer system 100 is shown with the first device 102 as a client device, although it is understood that the computer system 100 can have the first device 102 as a different type of device. For example, the first device 102 can be a server.

Also for illustrative purposes, the computer system 100 is shown with the second device 106 as a server, although it is understood that the computer system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the computer system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial computer system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the computer system 100. The first control unit 412 can also execute the first software 426 for the other functions of the computer system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the computer system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the computer system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the computer system 100 is shown with the second storage unit 446 as a single hierarchy storage system, although it is understood that the computer system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The computer system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computer system 100 is described by operation of the first device 102 and the second device 106. It is understood that the first device 102 and the second device 106 can operate any of the modules and functions of the computer system 100. For example, the first device 102 is described to operate the location unit 420, although it is understood that the second device 106 can also operate the location unit 420.

Figure 5:
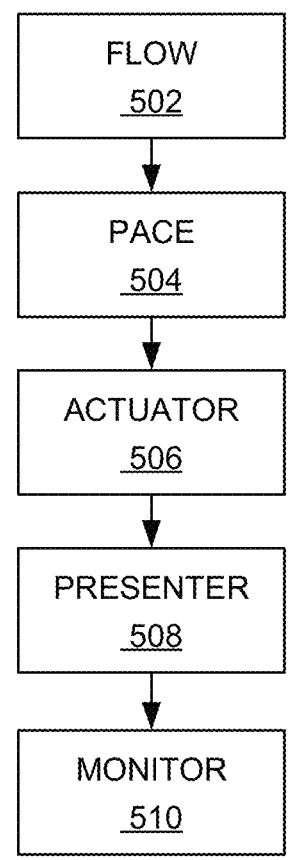
FIG. 5 is a control flow of the computer system.

Referring now to FIG. 5, therein is shown a control flow of the computer system 100. The computing system 100 can include a flow module 502. The flow module 502 determines the travel speed 214 of FIG. 2. For example, the flow module 502 can determine the travel speed 214 based on the change between multiple instances of the current location 208.

For example, the flow module 502 can calculate the travel speed 214 of the user's vehicle 206 of FIG. 2 based on one instance of the current location 208 and another instance of the current location 208. More specifically as an example, the flow module 502 can calculate the travel speed 214 based on the travel duration 220 of FIG. 2, the travel distance 224 of FIG. 2, or a combination thereof between the two instances of the current location 208 traveled. The computing system 100 can transmit the travel speed 214 to a pace module 504.

The computing system 100 can include the pace module 504, which can be coupled to the flow module 502. The pace module 504 generates the pace maker 302 of FIG. 3. For example, the pace module 504 can generate the pace maker 302 for presenting to the first device 102 of FIG. 1, the user's vehicle 206, or a combination thereof.

The pace module 504 can generate the pace maker 302 in a number of ways. For example, the pace module 504 can generate the pace maker 302 based on the travel speed 214, the speed threshold 216 of FIG. 2, the speed difference 218 of FIG. 2, or a combination thereof. More specifically as an example, the speed threshold 216 can represent the government specified speed regulation. The pace module 504 can generate the pace maker 302 based on whether the travel speed 214 is below, meets, exceeds, or a combination thereof the speed threshold 216. For further example, the pace module 504 can generate the pace maker 302 based on the speed difference 218 between the travel speed 214 and the speed threshold 216.

For a specific example, the pace module 504 can generate the pace maker 302 including the illumination configuration 316 of FIG. 3. As discussed above, the pace module 504 can generate the pace maker 302 based on the speed difference 218 between the travel speed 214 and the speed threshold 216. The pace module 504 can control the illumination configuration 316 granularly based on the speed difference 218.

More specifically as an example, the speed difference 218 can include the percentage difference, the actual speed difference, or a combination thereof. For example, the speed difference 218 can represent the percentage difference, the actual speed difference, or a combination thereof for the travel speed 214 below, equivalent, or above the speed threshold 216.

Continuing with the example, the pace module 504 can determine the illumination configuration 316 based on the speed difference 218. For example, based on the degree of the speed difference 218, the pace module 504 can determine or update the illumination configuration 316 of the pace maker 302. For a specific example, the illumination configuration 316 can include the pace maker intensity 318 of FIG. 3, the pace maker coloration 320 of FIG. 3, or a combination thereof.

Continuing with the example, the pace module 504 can determine the pace maker intensity 318, the pace maker coloration 320, or a combination thereof for each difference of the speed difference 218 relative to the speed threshold 216. More specifically as an example, one instance of the pace maker intensity 318 can be different from another instance of the pace maker intensity 318 based on the relative difference of the speed difference 218 from the speed threshold 216.

For example, the pace module 504 can determine the pace maker intensity 318 for the speed difference 218 that is 20% above or below the speed threshold 216 to be brighter or dimer than the pace maker intensity 318 for the speed difference 218 that is 10% above or below the speed threshold 216. For a different example, the pace module 504 can determine the pace maker coloration 320 of the pace maker 302 to be blue when the speed difference 218 can be zero, red when the speed difference 218 is 20 kilometers above or below the speed threshold 216, orange when the speed difference 218 is 10 kilometers above or below the speed threshold 216, or a combination thereof.

The pace module 504 can generate the pace maker 302 based on the travel context 202 of FIG. 2. For example, the travel context 202 can include the weather condition, the traffic condition, the time of day, week, month, year, season, or a combination thereof. The pace module 504 can determine or update the illumination configuration 316 for the travel context 202 similarly as the pace module 504 determining or updating the illumination configuration 316 based on the speed difference 218.

For example, the travel context 202 can represent various instances of the traffic condition including no traffic, moderate traffic, heavy traffic, standstill, or a combination thereof. No traffic can be determined if the travel speed 214 meets or exceeds the speed threshold 216. Moderate traffic can be determine if the travel speed 214 is, for example, 20 to 50% below the speed threshold 216. Heavy traffic can be determined if the travel speed 214 is, for example, 50 to 90% below the speed threshold 216. Standstill can be determined if the travel speed 214 is at zero. For another example, the travel context 202 can represent various instances of the weather condition including sunny, overcast, foggy, rain, stormy, blizzard, hail, icy, or a combination thereof.

More specifically as an example, the pace module 504 can generate the pace maker 302 based on the separation distance 232 of FIG. 2 between the current location 208 and the other's location 230 of FIG. 2 factoring the travel context 202. For example, the pace module 504 can determine or update the illumination configuration 316 based on the separation distance 232 below, equivalent, or above the distance threshold 234 of FIG. 2 for the travel context 202. The separation distance 232 can be measured by GPS coordinates between the current location 208 and the other's location 230 detected by the location unit 420 of FIG. 4.

For example, if the separation distance 232 meets or exceeds the distance threshold 234, the pace module 504 can determine the illumination configuration 316 different from the separation distance 232 below the distance threshold 234. For a specific example, the pace module 504 can determine the illumination configuration 316 including the pace maker intensity 318 that is brighter, the pace maker coloration 320 that is more conspicuous, or a combination thereof if the separation distance 232 is below the distance threshold 234 than if the separation distance 232 meets or exceeds the distance threshold 234.

For further example, the pace module 504 can determine the illumination configuration 316 including the pace maker intensity 318 that is dimmer, the pace maker coloration 320 that is less conspicuous, or a combination thereof if the travel context 202 represents no traffic, sunny, or a combination thereof than if the travel context 202 represents heavy traffic, blizzard, or a combination thereof. The conspicuous level of the pace maker coloration 320 can represent the visible light spectrum where the color ranging from purple can represent less conspicuous than the color representing red.

It has been discovered that the computing system 100 determining the illumination configuration 316 based on the separation distance 232 improves the performance of the first device 102, the computing system 100, or a combination thereof. By factoring the separation distance 232, the computing system 100 can efficiently determine the pace maker intensity 318, the pace maker coloration 320, or a combination thereof appropriate for the travel context 202 traveled by the user. As a result, the computing system 100 can improve the resource allocation to determine the illumination configuration 316 by factoring the separation distance 232.

The pace module 504 can update the speed threshold 216, the distance threshold 234, or a combination thereof dynamically and in real time based on the travel context 202. For a specific example, the pace module 504 can update the speed threshold 216 to the physical speed less than the speed set by the government entity based on the travel context 202. For another example, the pace module 504 can update the distance threshold 234 by increasing or decreasing the distance threshold 234 based on the travel context 202. For a specific example, the pace module 504 can update the distance threshold 234 under the travel context 202 representing no traffic, sunny, or a combination thereof with a value greater than the distance threshold 234 under the travel context 202 representing heavy traffic, blizzard, or a combination thereof.

The pace module 504 can generate the pace maker 302 based on the street type 210 of FIG. 2, the lane type 212 of FIG. 2, the road segment 204 of FIG. 2, or a combination thereof. For example, the pace module 504 can generate the pace maker 302 for particular instance of the street type 210, the road segment 204, or a combination thereof while excluding the generation of the pace maker 302 for other instance of the street type 210, the road segment 204, or a combination thereof.

More specifically as an example, the pace module 504 can generate the pace maker 302 for the street type 210 having only one lane while not generating the pace maker 302 for the street type 210 having multiple lanes. For further example, the pace module 504 can generate the pace maker 302 for the lane type 212 representing a non-carpool lane while not generating the pace maker 302 for the lane type 212 of carpool lane. For a different example, the pace module 504 can generate the pace maker 302 for the street type 210 representing the highway while not for the street type 210 representing the local road. For a different example, the pace module 504 can generate the pace maker 302 for the road segment 204 having the travel context 202 representing no traffic while not for the road segment 204 having the travel context 202 representing heavy traffic.

For another example, the pace module 504 can generate the pace maker 302 based on the travel distance 224, the travel speed 214, the estimated time of arrival 226 of FIG. 2, or a combination thereof. More specifically as an example, the estimated time of arrival 226 can be earlier or delayed based on the travel context 202. The pace module 504 can generate the pace maker 302 to instigate the increase or decrease of the travel speed 214 of the user's vehicle 206 to meet the planned instance of the estimated time of arrival 226 for traveling the travel distance 224.

Each factor discussed above can be factored in various combinations by the pace module 504 to generate the pace maker 302 for presenting to the first device 102 of FIG. 1, the user's vehicle 206, or a combination thereof. The pace module 504 can transmit the pace maker 302 to an actuator module 506.

The computing system 100 can include the actuator module 506, which can be coupled to the pace module 504. The actuator module 506 actuates the pace maker device 310 of FIG. 3. For example, the actuator module 506 can actuate the pace maker device 310 based on the actuation pattern 322 of FIG. 3 for presenting the pace maker 302. For another example, the pace maker device 310 can include an LED. More specifically as an example, the pace maker device 310 can be included as a component of the street light, the road reflector, in-pavement LED, or a combination thereof for emitting the pace maker 302.

The pace maker 302 can include the virtual pace maker 308 of FIG. 3, LED light, or a combination thereof. The pace maker device 310 actuated can emit the pace maker 302 from the road, project the virtual pace maker 308 on the road, or a combination thereof based on the factors to present the pace maker 302 as discussed below.

The actuator module 506 can actuate the pace maker device 310 in a number of ways. For example, the actuator module 506 can actuate the pace maker device 310 based on the same factors to generate to pace maker 302 as discussed above to present the pace maker 302. For a specific example, the actuator module 506 can actuate the pace maker device 310 based on the travel speed 214, the illumination configuration 316, the travel context 202, the separation distance 232, the street type 210, the lane type 212, the road segment 204, the travel distance 224, or a combination thereof in various combination including other factors as discussed above.

For another example, the actuator module 506 can actuate the pace maker device 310 based on the variety of instances of the actuation pattern 322 for presenting the pace maker 302. For a specific example, the actuator module 506 can actuate multiple instances of the pace maker device 310 based on the actuation pattern 322. More specifically as an example, the actuation pattern 322 can include actuating each instance of the pace maker device 310 for presenting the pace maker 302. For a different example, the actuation pattern 322 can include actuating every other instance of the pace maker device 310 for the presenting the pace maker 302.

For further example, the actuator module 506 can actuate the pace maker device 310 based on the current location 208, the pace maker location 312 of FIG. 3, the actuation pattern 322, or a combination thereof. The actuator module 506 can actuate the pace maker device 310 based on detecting the current location 208 of the user's vehicle 206. By tracking the current location 208 and determining the pace maker distance 314 of FIG. 3 between the current location 208 and the pace maker device 310 with the location unit 420, the actuator module 506 can determine which instance of the pace maker device 310 to present the pace maker 302.

More specifically as an example, once the pace maker distance 314 between the current location 208 and the pace maker location 312 meets or exceeds the distance threshold 234, the actuator module 506 can actuate the pace maker device 310 for presenting the pace maker 302 to the user's vehicle 206. For further example, the actuator module 506 can actuate the pace maker device 310 based on the actuation pattern 322, the pace maker distance 314, the distance threshold 234, or a combination thereof.

For example, the distance threshold 234 can dynamically change based on the actuation pattern 322. If the actuation pattern 322 is actuating every other instance of the pace maker device 310, the distance threshold 234 can have greater value in distance than the actuation pattern 322 for actuating each instance of the pace maker device 310. More specifically as an example, the pace maker distance 314 between the current location 208 and the pace maker location 312 for actuation pattern 322 of actuating every other instance of the pace maker device 310 can be greater than the pace maker distance 314 between the current location 208 and the pace maker location 312 for actuation pattern 322 of actuating each instance of the pace maker device 310.

The actuation pattern 322 can include various combination of actuating multiple instances of the pace maker device 310 including every five instance of the pace maker device 310, every ten instance of the pace maker device 310, or a combination thereof. For a different example, the actuation pattern 322 can include actuating multiple instances of the pace maker device 310 include set instance of the time period 324 of FIG. 3 including every three seconds, every five seconds, or a combination thereof.

For a different example, the actuator module 506 can actuate the pace maker device 310 based on the travel speed 214, the speed threshold 216, the current location 208, the other's location 230, or a combination thereof. More specifically as an example, the actuator module 506 can actuate the pace maker device 310 based on the travel speed 214 below, meeting, exceeding, or a combination thereof the speed threshold 216. For a specific example, if the travel speed 214 is below the speed threshold 216 representing the speed limit, the actuator module 506 can actuate the pace maker device 310 to present the pace maker 302 for notifying the user's vehicle 206 to pick up the travel pace 304 of FIG. 3. In contrast, if the travel speed 214 is above the speed threshold 216 representing the speed limit, the actuator module 506 can actuate the pace maker device 310 to present the pace maker 302 for notifying the user's vehicle 206 to slowdown.

For a different example, the actuator module 506 can actuate the pace maker device 310 based on the separation distance 232 between the current location 208 and the other's location 230. More specifically as an example, if the separation distance 232 is below or above the distance threshold 234, the actuator module 506 can actuate the pace maker device 310 to present the pace maker 302 for notifying the user of the first device 102, the user's vehicle 206, or a combination thereof to increase or decrease the separation distance 232. For a specific example, the pace maker device 310 can represent the license plate, the license plate frame, or a combination thereof. The actuator module 506 can actuate the pace maker device 310 based on comparing the separation distance 232 to the distance threshold 234 for presenting the pace maker 302 from the license plate, the license plate frame, or a combination thereof.

For another example, the actuator module 506 can actuate the pace maker device 310 based on the travel context 202. For example, the travel context 202 can indicate heavy traffic building up on the road segment 204. The actuator module 506 can actuate the pace maker device 310 to alleviate the heavy traffic by presenting the pace maker 302 to control the traffic flow.

Each factor discussed above can be factored in various combinations by the actuator module 506 to actuate the pace maker device 310. The actuator module 506 can transmit the actuation pattern 322 to a presenter module 508.

It has been discovered that the computing system 100 actuating the pace maker device 310 based on the separation distance 232, the travel context 202, the actuation pattern 322, the pace maker distance 314, or a combination thereof can improve the performance of the computing system 100 to control the traffic flow with the pace maker 302. By factoring the separation distance 232, the travel context 202, the actuation pattern 322, the pace maker distance 314, or a combination thereof, the computing system 100 can improve when to actuate the pace maker device 310. As a result, the computing system 100 can eliminate unnecessary actuation of the pace maker device 310 to improve the resource allocation for operating the computing system 100.

The computing system 100 can include the presenter module 508, which can be coupled to the actuator module 506. The presenter module 508 presents the pace maker 302. For example, the presenter module 508 can present the pace maker 302 as the pace maker 302 generated by the pace module 504 to the first device 102, the pace maker device 310, the user's vehicle 206, or a combination thereof.

The presenter module 508 can present the pace maker 302 in a number of ways. For example, the presenter module 508 can present the pace maker 302 based on the pace maker type 306 of FIG. 3 including the virtual pace maker 308, the pace maker device 310, or a combination thereof. For a specific example, the presenter module 508 can present the virtual pace maker 308 to the first device 102.

For further example, the presenter module 508 can present the virtual pace maker 308 based on each factor discussed above in various combinations similar to the pace module 504 generating the pace maker 302. For example, the presenter module 508 can present the pace maker 302 based on the travel speed 214, the illumination configuration 316, the travel context 202, the separation distance 232, the street type 210, the lane type 212, the road segment 204, the travel distance 224, or a combination thereof in various combination with other factors as discussed above. For another example, the presenter module 508 can present the pace maker 302 based on the pace maker device 310 actuated based on each factor discussed above in various combinations similar to the pace module 504 generating the pace maker 302.

The computing system 100 can include a monitor module 510, which can be coupled to the presenter module 508. The monitor module 510 monitors the travel pace 304. For example, the monitor module 510 can monitor the travel pace 304 based on the pace match level 326 of FIG. 3.

The monitor module 510 can monitor the travel pace 304 in a number of ways. For example, the monitor module 510 can monitor the travel pace 304 based on tracking the pace match level 326 to the pace maker 302. More specifically as an example, the pace maker 302 can be presented in certain instance of the illumination configuration 316. For a specific example, to notify the ideal traffic flow for the travel context 202, the pace maker 302 can be presented having certain instance of the pace maker intensity 318, the pace maker coloration 320, or a combination thereof. The monitor module 510 can determine the pace match level 326 based on tracking the travel speed 214 that matches the travel speed 214 for the ideal traffic flow presented by the pace maker 302 for example. For example, the ideal traffic flow can represent the travel speed 214 traveling at the speed limit specified by the government.

For further example, the monitor module 510 can determine the pace match level 326 based on the travel distance 224, the travel duration 220, or a combination thereof for maintaining the travel speed 214 presented by the pace maker 302. For a different example, the pace maker 302 having the illumination configuration 316 for the ideal traffic flow for the travel context 202 can be projected by the pace maker device 310 on the road. The monitor module 510 can determine the pace match level 326 based on how often the travel speed 214 of the user's vehicle 206 matched the travel speed 214 presented by the pace maker 302 by reaching the pace maker location 312 at the travel speed 214 within the travel duration 220.

For illustrative purposes, the computing system 100 is described with the monitor module 510 monitoring the travel pace 304, although the monitor module 510 can operate differently. For example, the monitor module 510 can generate the travel cost 228 of FIG. 2 based on the pace match level 326.

More specifically as an example, the travel cost 228 can include the toll cost for traveling on the street type 210 requiring the fee. The monitor module 510 can generate or update the travel cost 228 dynamically and in real time based on the pace match level 326. For a specific example, based on the pace match level 326, the travel cost 228 can be increased or decreased for promoting safe driving by the user of the first device 102.

For further example, the monitor module 510 can generate the match ranking 328 of FIG. 3. More specifically as an example, the monitor module 510 can generate the match ranking 328 based on multiple instances of the pace match level 326 from various users of the computing system 100. The monitor module 510 can generate the match ranking 328 based on ordering the user having the highest instance of the pace match level 326 to the lowest instance of the pace match level 326. For additional example, the monitor module 510 can generate the match ranking 328 for the street type 210, the road segment 204, the geographic region 222 of FIG. 2, or a combination thereof.

The physical transformation from presenting the pace maker 302 results in the movement in the physical world, such as people using the first device 102, the vehicle, or a combination thereof, based on the operation of the computer system 100. As the movement in the physical world occurs, the movement itself creates additional information that is transformed from physical aspect to digital data for further generation of the pace maker 302, actuation of the pace maker device 310, presentation of the pace maker 302, or a combination thereof for the continued operation of the computer system 100 and to continue the movement in the physical world.

The first software 426 of FIG. 4 of the first device 102 of FIG. 4 can include the modules for the computer system 100. For example, the first software 426 can include the flow module 502, the pace module 504, the actuator module 506, the presenter module 508, the monitor module 510, or a combination thereof. The first control unit 412 of FIG. 4 can execute the modules to perform the functions dynamically and in real time.

The first control unit 412 can execute the first software 426 for the flow module 502 to determine the travel speed 214. The first control unit 412 can execute the first software 426 for the pace module 504 to generate the pace maker 302. The first control unit 412 can execute the first software 426 for the actuator module 506 to actuate the pace maker device 310. The first control unit 412 can execute the first software 426 for the presenter module 508 to present the pace maker 302. The first control unit 412 can execute the first software 426 for the monitor module 510 to monitor the travel pace 304.

The second software 442 of FIG. 4 of the first device 102 of FIG. 4 can include the modules for the computer system 100. For example, the second software 442 can include the flow module 502, the pace module 504, the actuator module 506, the presenter module 508, the monitor module 510, or a combination thereof. The second control unit 434 of FIG. 4 can execute the modules to perform the functions dynamically and in real time.

The second control unit 434 can execute the second software 442 for the flow module 502 to determine the travel speed 214. The second control unit 434 can execute the second software 442 for the pace module 504 to generate the pace maker 302. The second control unit 434 can execute the second software 442 for the actuator module 506 to actuate the pace maker device 310. The second control unit 434 can execute the second software 442 for the presenter module 508 to present the pace maker 302. The second control unit 434 can execute the second software 442 for the monitor module 510 to monitor the travel pace 304.

The modules of the computer system 100 can be partitioned between the first software 426 and the second software 442. The second software 442 can include the flow module 502, the pace module 504, the actuator module 506, and the monitor module 510. The second control unit 434 can execute modules partitioned on the second software 442 as previously described.

The first software 426 can include the presenter module 508. Based on the size of the first storage unit 414, the first software 426 can include additional modules of the computer system 100. The first control unit 412 can execute the modules partitioned on the first software 426 as previously described.

It has been discovered that the computing system 100 having different configuration of a distributed architecture to actuate each module on the first device 102 or the second device 106 enhances the capability to generate the pace maker 302, actuate the pace maker device 310, or a combination thereof. By having the distributed architecture, the computing system 100 can enable load distribution to receive the information related to the travel context 202 including the traffic condition, the weather condition, the current location 208, the other's location 230, the pace maker location 312, or a combination thereof to reduce congestion in bottleneck in the communication path 104 of FIG. 1 and enhance the capability of the computing system 100. As a result, the computing system 100 can improve the performance to control the traffic flow by presenting the pace maker 302, actuating the pace maker device 310, or a combination for safer operation of the first device 102, the vehicle, or a combination thereof The first control unit 412 can operate the first communication unit 416 of FIG. 4 to transmit the travel speed 214, the pace maker 302, the travel pace 304, or a combination thereof to or from the second device 106 through the communication path 104 of FIG. 4. The first control unit 412 can operate the first software 426 to operate the location unit 420 of FIG. 4. The second control unit 434 can operate the second communication unit 436 of FIG. 4 to transmit the travel speed 214, the pace maker 302, the travel pace 304, or a combination thereof to or from the first device 102 through the communication path 104.

The computer system 100 describes the module functions or order as an example. The modules can be partitioned differently. For example, the merge module 410 and the placement module 412 can be combined. Each of the modules can operate individually and independently of the other modules. Furthermore, data generated in one module can be used by another module without being directly coupled to each other. For example, the merge module 410 can receive the current location 208 from the location module 402. Further, one module transmitting to another module can represent one module communicating, sending, receiving, or a combination thereof the data generated to or from another module.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules. Furthermore, the first control unit 412, the second control unit 434, or a combination thereof can be implemented as software, hardware, or a combination thereof.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computer system 100 or installed as a removable portion of the computer system 100.

Figure 6:
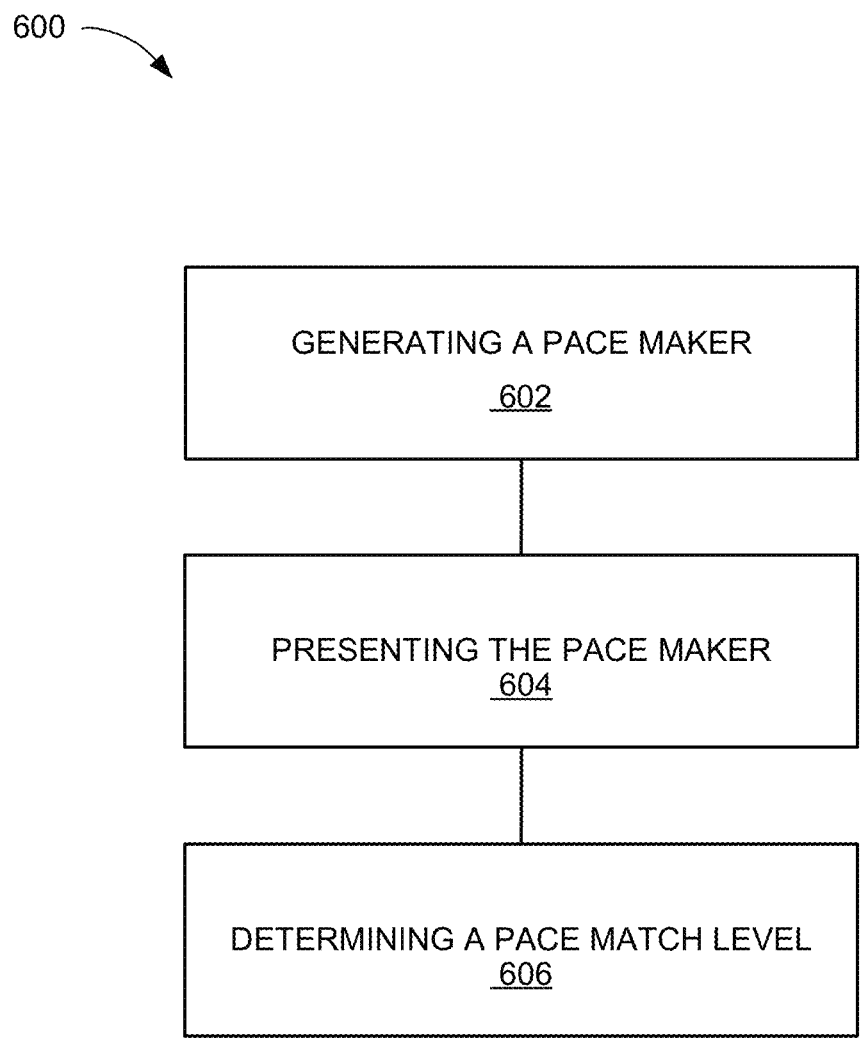
FIG. 6 is a flow chart of a method of operation of the computer system in a further embodiment of the present invention.

Referring now to FIG. 6, therein is shown a flow chart of a method 600 of operation of the computer system 100 in a further embodiment of the present invention. The method 600 includes: generating a pace maker including an illumination configuration with a control unit for actuating a pace maker device based on an actuation pattern in a block 502; presenting the pace maker based on a pace maker type for controlling a travel pace in a block 504; and determining a pace match level based on comparing the travel pace and the pace maker (506).

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto fore set forth herein or shown in the accompanying drawings are to be interpreted in an illustrative and non-limiting sense.

What is claimed is:

1. A method of operation of a computer system comprising:
   generating a pace maker including an illumination configuration with a control unit for actuating a pace maker device based on an actuation pattern wherein the illumination configuration is updated granularly based on a relative difference between a speed difference and a speed threshold and further wherein the actuation pattern is considered to update a distance threshold dynamically and in real time based on change in a travel context;
   presenting the pace maker based on a pace maker type for controlling a travel pace; and
   determining a pace match level based on comparing the travel pace and the pace maker.

2. The method as claimed in claim 1 wherein generating the pace maker includes generating the pace maker based on the speed difference between a travel speed and the speed threshold.

3. The method as claimed in claim 1 wherein generating the pace maker includes determining the illumination configuration including a pace maker intensity, a pace maker coloration, or a combination thereof.

4. The method as claimed in claim 1 wherein generating the pace maker includes generating the pace maker based on a separation distance between a current location and other's location.

5. The method as claimed in claim 1 wherein generating the pace maker includes generating the pace maker representing a virtual pace maker for presenting on a device.

6. The method as claimed in claim 1 wherein generating the pace maker includes generating the pace maker for actuating multiple instances of the pace maker device based on the actuation pattern.

7. The method as claimed in claim 1 further comprising determining a pace maker distance between a current location and a pace maker location for actuating the pace maker device.

8. The method as claimed in claim 1 wherein generating the pace maker includes generating the pace maker for actuating the pace maker device based on comparing a travel speed to the speed threshold for presenting the pace maker.

9. The method as claimed in claim 1 further comprising generating a travel cost based on the pace match level for tracking the travel pace.

10. The method as claimed in claim 1 further comprising generating a match ranking based on multiple instances of the pace match level for updating a travel cost.

11. A computer system comprising:
    a control unit for:
       generating a pace maker including an illumination configuration;
       actuating a pace maker device based on an actuation pattern wherein the illumination configuration is updated granularly based on a relative difference between a speed difference and a speed threshold and further wherein the actuation pattern is considered to update a distance threshold dynamically and in real time based on chap e in a travel context;
       presenting the pace maker based on a pace maker type for controlling a travel pace;
       determining a pace match level based on comparing the travel pace and the pace maker; and
    a communication unit, coupled to the control unit, for transmitting the pace match level.

12. The system as claimed in claim 11 wherein the control unit is for generating the pace maker based on the speed difference between a travel speed and the speed threshold.

13. The system as claimed in claim 11 wherein the control unit is for determining the illumination configuration including a pace maker intensity, a pace maker coloration, or a combination thereof.

14. The system as claimed in claim 11 wherein the control unit is for generating the pace maker based on a separation distance between a current location and other's location.

15. The system as claimed in claim 11 wherein the control unit is for generating the pace maker representing a virtual pace maker for presenting on a device.

16. A non-transitory computer readable medium including instructions for execution, the instructions comprising:
    generating a pace maker including an illumination configuration for actuating a pace maker device based on an actuation pattern wherein the illumination configuration is updated granularly based on a relative difference between a speed difference and a speed threshold and further wherein the actuation pattern is considered to update a distance threshold dynamically and in real time based on change in a travel context;
    presenting the pace maker based on a pace maker type for controlling a travel pace; and
    determining a pace match level based on comparing the travel pace and the pace maker.

17. The non-transitory computer readable medium as claimed in claim 16 wherein generating the pace maker includes generating the pace maker based on the speed difference between a travel speed and the speed threshold.

18. The non-transitory computer readable medium as claimed in claim 16 wherein generating the pace maker includes determining the illumination configuration including a pace maker intensity, a pace maker coloration, or a combination thereof.

19. The non-transitory computer readable medium as claimed in claim 16 wherein generating the pace maker includes generating the pace maker based on a separation distance between a current location and other's location.

20. The non-transitory computer readable medium as claimed in claim 16 wherein generating the pace maker includes generating the pace maker representing a virtual pace maker for presenting on a device.

* * * * *